(12) United States Patent
Ishimoto et al.

(10) Patent No.: US 7,937,181 B2
(45) Date of Patent: May 3, 2011

(54) CLAMP INSTRUCTION METHOD

(75) Inventors: Kousuke Ishimoto, Fukui (JP); Kouichi Amaya, Fukui (JP)

(73) Assignee: Matsuura Machinery Corporation, Fukui-shi, Fukui (JP)

( * ) Notice: Subject to any disclaimer, the term of this patent is extended or adjusted under 35 U.S.C. 154(b) by 672 days.

(21) Appl. No.: 12/014,346

(22) Filed: Jan. 15, 2008

(65) Prior Publication Data
US 2009/0065993 A1    Mar. 12, 2009

(30) Foreign Application Priority Data

Sep. 7, 2007    (JP) .................................. 2007-232273

(51) Int. Cl.
  *G05B 19/18*    (2006.01)
  *G01C 19/04*    (2006.01)
(52) U.S. Cl. ............. 700/159; 700/260; 74/5.22; 74/5 R
(58) Field of Classification Search .................. 700/159, 700/245, 259, 260, 160; 74/5.22, 5 R, 5.4; 318/568.1
See application file for complete search history.

(56) References Cited

U.S. PATENT DOCUMENTS

| | | | | |
|---|---|---|---|---|
| 4,791,588 A * | 12/1988 | Onda et al. | ..................... | 700/260 |
| 6,008,616 A * | 12/1999 | Nagayama et al. | ........... | 318/773 |
| 2006/0197402 A1 * | 9/2006 | Gomyo et al. | ................ | 310/216 |
| 2008/0047375 A1 * | 2/2008 | Sonoura | ........................ | 74/5.22 |
| 2009/0084623 A1 * | 4/2009 | Dagenais | ...................... | 180/210 |

FOREIGN PATENT DOCUMENTS

| | | |
|---|---|---|
| JP | 9-155757 | 6/1997 |
| WO | 9939109 | 8/1999 |

* cited by examiner

*Primary Examiner* — Albert Decady
*Assistant Examiner* — Douglas S Lee
(74) *Attorney, Agent, or Firm* — Richard M. Goldberg

(57) ABSTRACT

A clamp of less waste instruction method for an addition axis, which omits instructions for clamping and unclamping and working in response to those instructions, includes the steps of, at a stage of working a work piece with a tool, measuring a rotational torque generated by the working with respect to the addition axis coupled to a table which supports the work piece or a pallet having the work piece mounted thereon; and generating a clamp instruction to the addition axis when the rotational torque exceeds a predetermined reference value.

2 Claims, 4 Drawing Sheets fig3
(a)
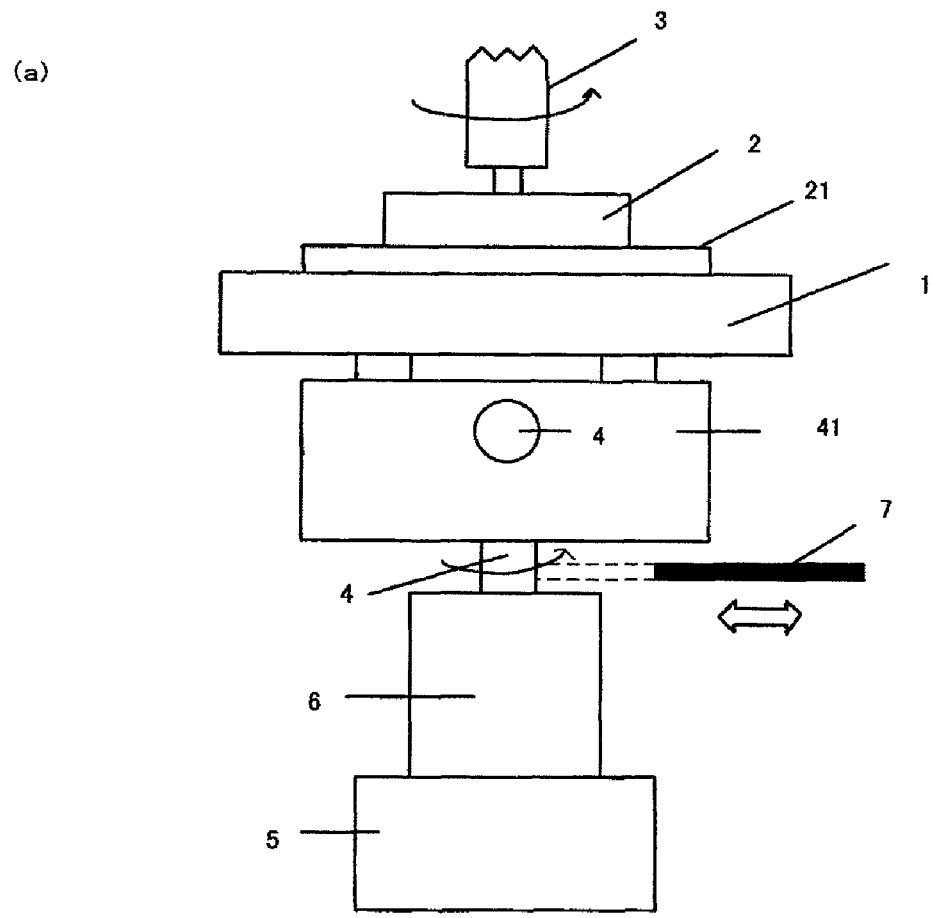
(b)
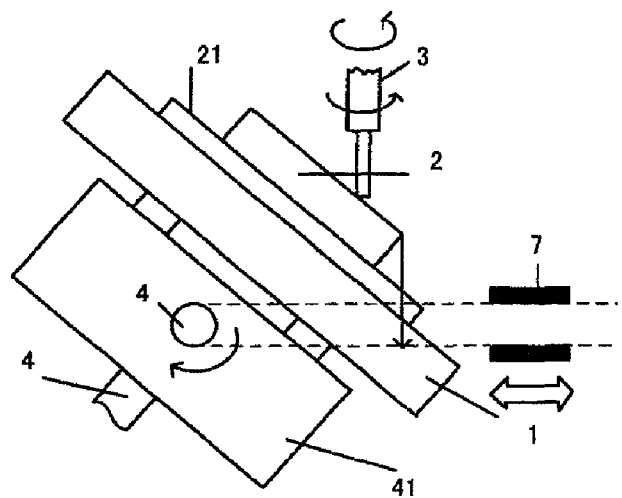

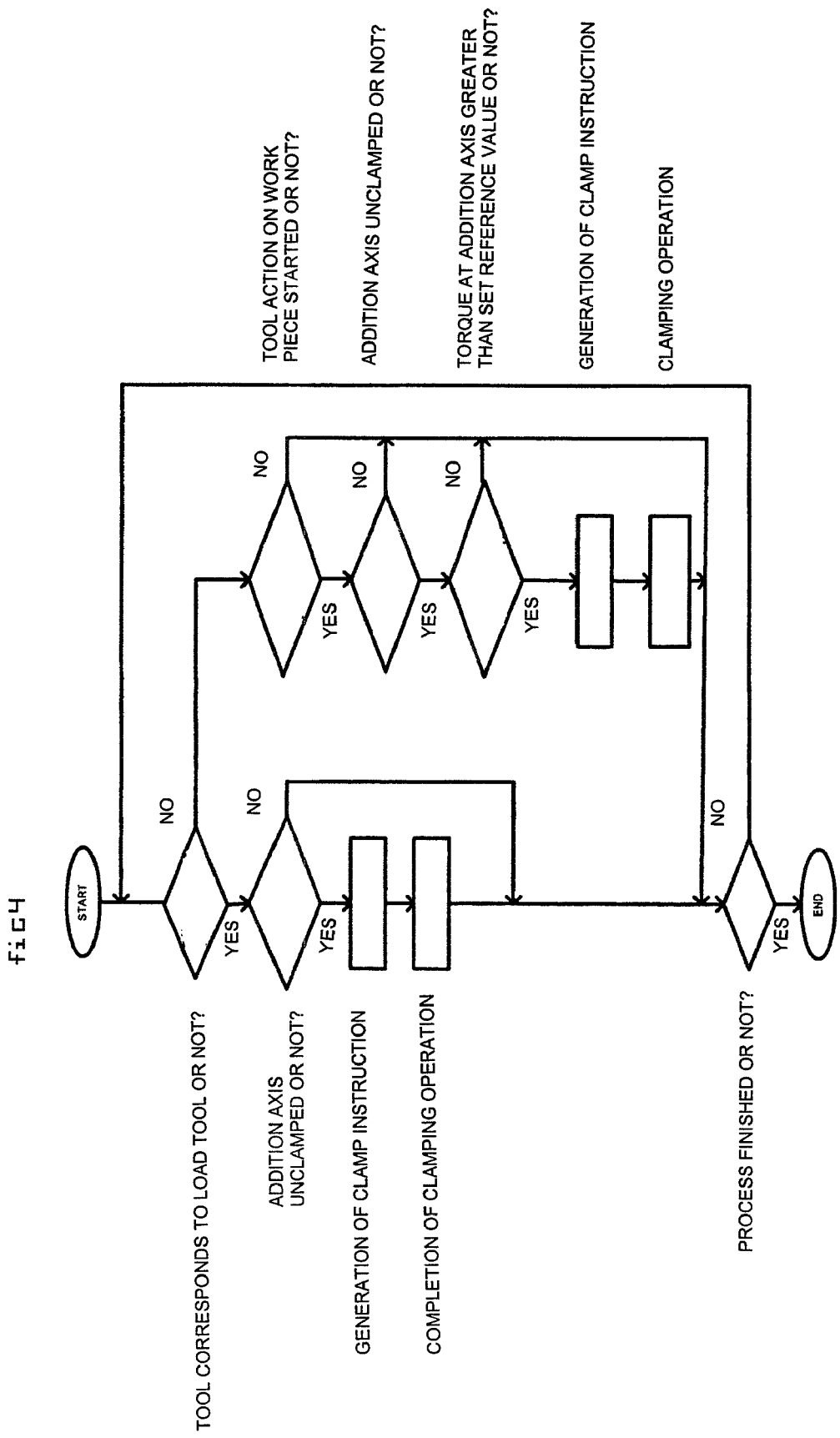

CLAMP INSTRUCTION METHOD

BACKGROUND OF THE INVENTION

1. Field of the Invention

The present invention relates to a clamp instruction method for a work piece or an addition axis of a table which supports a pallet having the work piece mounted thereon.

2. Description of the Related Art

Addition axes of two different directions (usually directions orthogonal to each other) are secured to the above-mentioned table. Conventionally, in a case where working involving rotation of a tool is carried out on a work piece supported directly on the table or via a pallet, a clamp instruction to secure the individual addition axes is generated at a stage before the execution of the working, and an unclamp instruction to release the secured state is generated at a stage when the working is finished.

When a rotational torque to rotate the table in a plane direction as shown in FIG. 3A along with the rotational working with a tool is generated at the time of effecting a three-directional linear movement and two-directional rotational movement on each addition axis, or when a rotational torque to revolve the table itself as shown in FIG. 3B is generated due to pressure or the like from the tool, each addition axis is grasped with substantial pressing force by a coupling portion which couples the addition axis to a drive source, so that the coupled state based on the grasp of the addition axis with the coupling portion is not always broken so that rotation to rotate the table in the plane direction or rotation to revolve the table does not always occur.

That is, even when working a work piece with a tool is carried out, there is not a little case occurring where the working state can be sufficiently supported by the grasp of the addition axis with the coupling portion, so that it is not always necessary to bring about a clamp state to secure the addition axis beforehand at the time of carrying out the working, and an unclamp state to release the clamp state after the working is finished.

Therefore, making a clamp state for each working on a work piece with a tool and making an unclamp state at the stage where the working is finished as in the prior art mean wasting of time in generation of an instruction for a clamp state and achievement thereof and generation of an instruction for an unclamp state and achievement thereof which are not always necessary. Such processes result in causing a lower working efficiency in the overall operation including arrangement of a work piece with respect to a tool and necessary working.

DISCLOSURE OF THE INVENTION

Problems to be Solved by the Invention

Accordingly, it is an object of the present invention to provide a clamp of less waste instruction method for omitting a clamp instruction and an unclamp instruction, and operations in response to those instructions, which should not originally be necessary, thereby improving the working efficiency of movement of a work piece and working on the work piece with a tool in the overall machining.

To achieve the object, the following fundamental construction is adopted. A clamp instruction method for an addition axis includes the steps of, at a stage of working a work piece with a tool, measuring a rotational torque generated by the working with respect to the addition axis coupled to a table which supports the work piece or a pallet having the work piece mounted thereon; and generating a clamp instruction to the addition axis when the rotational torque exceeds a predetermined reference value, wherein prior to working with the tool, further comprising the steps of:

determining whether the tool is a load tool whose working generates a rotational torque on the addition axis found beforehand to exceed a set reference value, and when the tool is the load tool, generating the clamp instruction before working with the load tool, and wherein at a time of instructing a tool change, further comprising the steps of:

determining whether or not a load tool is to be disposed on a spindle axis through a tool change operation, and when the tool is the load tool, generating the clamp instruction during the tool change operation.

BRIEF DESCRIPTION OF THE DRAWINGS

FIGS. 3A and 3B are side views showing correlation among a tool, a table and an addition axis, FIG. 3A showing a rotational moment applied to an addition axis by the rotation of a tool to cause a table to rotate in a plane direction, while FIG. 3B shows a rotational moment applied to the addition axis by pressure or the like of the tool to cause table to revolve; and FIG. 4 is a flowchart illustrating the basic structure of the present invention.

DESCRIPTION OF SYMBOLS

Figure 1:
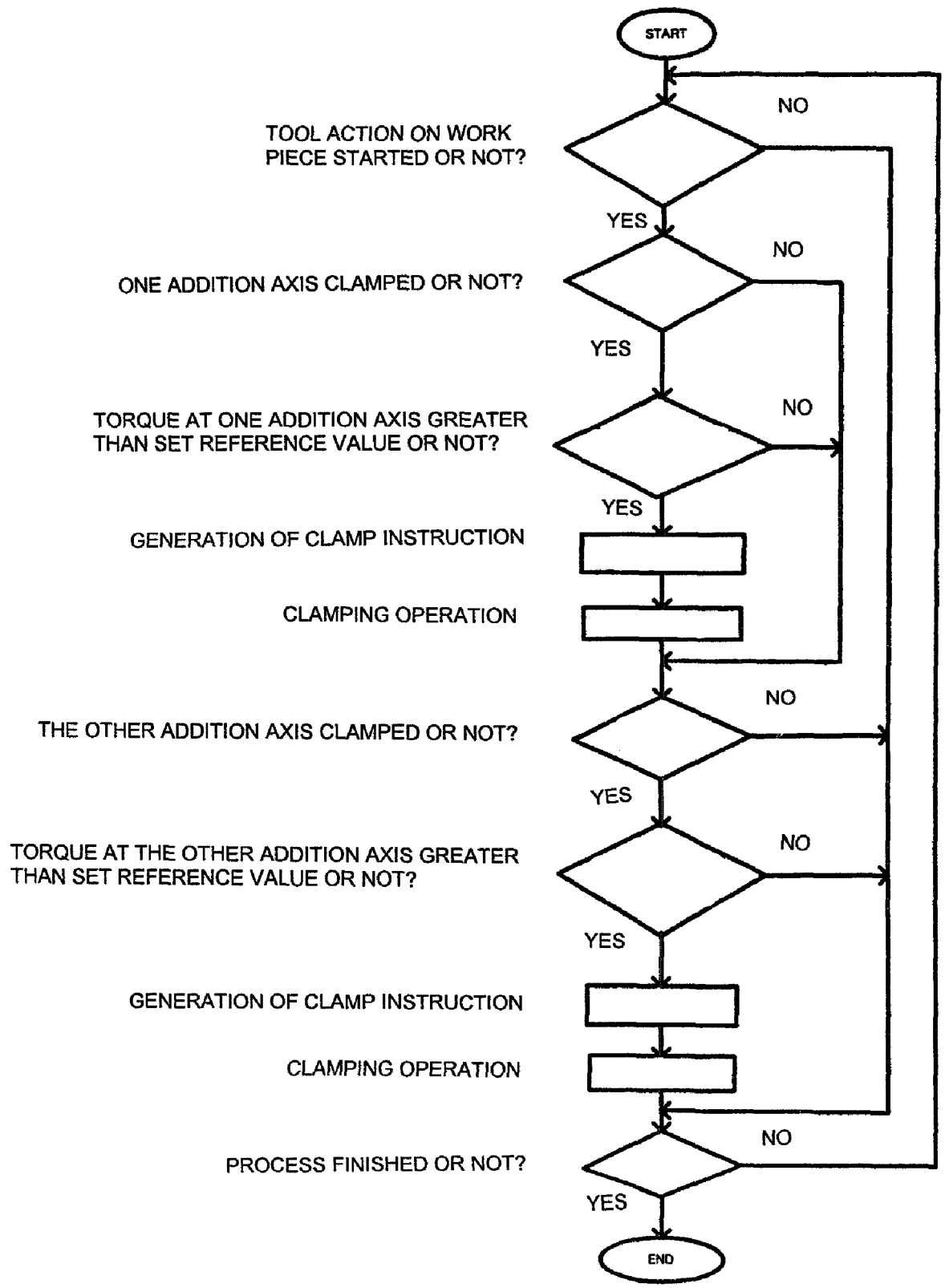
FIG. 1 is a flowchart to achieve control of Example 1.

1 table
2 work piece
21 bed on which the work piece is to be mounted
3 tool
4 addition axis
41 base integral with the addition axis
5 drive source
6 coupling portion
7 brake piece for clamping

BEST MODE FOR CARRYING OUT THE INVENTION

The basic structure of the present invention will be described below.

The fundamental principle of the basic structure is generation of clamp instruction when the rotational torque generated at an addition axis becomes equal to or greater than a predetermined reference value as a consequence of working on a work piece carried out by the rotation or pressing of a tool.

Normally, a clamp instruction during a process program is neglected, and the rotational torque is measured after working on the work piece with a tool, to determine whether or not the torque is equal to or greater than a predetermined reference value, so that, when the torque is equal to or greater than the reference value, a clamp instruction is generated.

However, when a so-called load tool, such as a drill, which generates a large torque to an addition axis, works, it is well inferred without measuring that the torque of the reference value is generated.

In consideration of the presence of such a load tool, as illustrated in a flowchart in FIG. 4, according to the basic structure of the present invention, it is determined beforehand whether or not the tool is a load tool, and when the tool is the load tool, particularly, a clamp instruction is generated immediately, whereas when the tool is not the load tool, the rotational torque is measured and then the clamp instruction is generated as needed.

When the measured torque is equal to or less than the reference value, an unclamp state is maintained and the addition axis is coupled by the grasp that is achieved by pressure applied by a coupling portion between the addition axis and a drive source. The coupling works against the rotational torque generated at the addition axis to prevent the rotation to cause a table to rotate in a plane direction or the rotation to cause the table to revolve as shown in FIGS. 3A and 3B, and maintains the grasp state.

When the measured torque exceeds the reference value, as illustrated in a flowchart in FIG. 4, a clamp instruction is generated so that a brake piece acts to clamp the addition axis so as to secure the addition axis. Thus, even when a significant rotational torque is generated, the rotation of the table in the plane direction and the revolution of the table itself can be prevented.

Even when a rotational torque equal to or greater than the reference value is generated, the pressure-oriented grasp state of the addition axis with the coupling portion is not always broken and maintains the original coupling state, so that slip does not occur between the coupling portion and the addition axis. (In other words, the reference value is set to a numerical value which does not cause the above-mentioned slip.)

When an excess torque which cannot maintain the grasp-based coupling state acts on the addition axis exceptionally, all axes (spindle axis, linear axis and addition axis) are stopped.

In a case where the clamp instruction is generated beforehand when the tool is a load tool, as illustrated in the flowchart in FIG. 4, there is no room for the above-mentioned slipping phenomenon to occur.

EXAMPLES

Examples will be described below.

Example 1

Example 1 is characterized in that when two addition axis of different directions are coupled to one table, selection of whether or not the clamp instruction for one addition axis is needed and generation of the clamp instruction when needed, and selection of clamping for the other addition axis and generation of the clamp instruction when needed are effected at approximately same timings.

Actually, since a computer executes only one instruction at each instance, as illustrated in a flowchart in FIG. 1, selection thereof for one addition axis and generation of an instruction, and selection thereof for the other addition axis and generation of an instruction are effected continuously or at timings close to continuous timings.

FIG. 1 omits a case where a load tool works. However, in a case where the load tool works, as shown in FIG. 4, steps of determining beforehand whether or not the tool corresponds to a load tool, and, when corresponding to the load tool, generating a clamp instruction and instructing the load tool to work should be added separately.

Example 2

Figure 2:
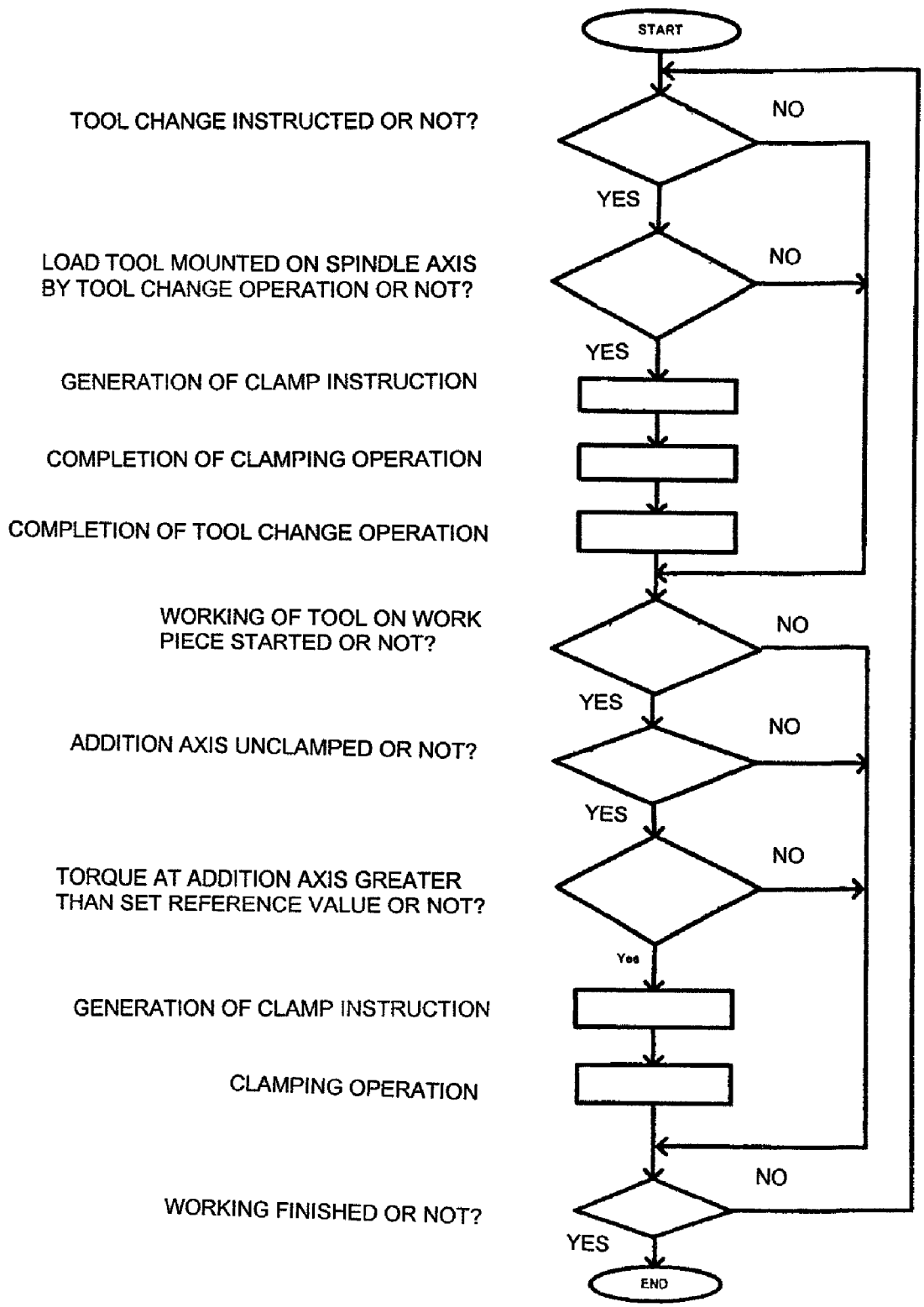
FIG. 2 is a flowchart illustrating the structure of Example 2.

Example 2 is characterized in that in a case of handling a load tool, as shown in FIG. 2, at the time of instructing tool change, it is determined whether or not the load tool is to be disposed on a spindle axis through a tool change operation, and when the tool is the load tool, the clamp instruction is generated during the tool change operation.

In Example 2, simultaneous clamping is executed during the tool change operation of mounting the load tool to the spindle axis, thereby shortening the machining time.

Effect of the Invention

Based on the above-mentioned structure of the present invention, it is possible to omit wasteful steps of generating a clamp instruction, clamping operation based on the clamp instruction, generating an unclamp instruction after occurrence of clamping, and unclamping operation, which steps should not originally be necessary, thereby improving the working efficiency of working with a tool on a work piece in the overall machining.

Further, it is also possible to generate a clamp instruction and execute clamping during working on a work piece with a tool, thereby shortening the overall machining time.

The present invention can be adapted in all fields of machining which use a table supported by an addition axis.

What is claimed is:

1. A clamp instruction method for an addition axis comprising the steps of, at a stage of working a work piece with a tool:
   measuring a rotational torque generated by the working with respect to the addition axis coupled to a table which supports one of:
   the work piece, and
   a pallet having the work piece mounted thereon; and
   generating a clamp instruction to the addition axis when the rotational torque exceeds a predetermined reference value,
   wherein prior to working with the tool, further comprising the steps of:
   determining whether the tool is a load tool whose working generates a rotational torque on the addition axis found beforehand to exceed a set reference value, and
   when the tool is the load tool, generating the clamp instruction before working with the load tool,
   and wherein at a time of instructing a tool change, further comprising the steps of:
   determining whether or not a load tool is to be disposed on a spindle axis through a tool change operation, and
   when the tool is the load tool, generating the clamp instruction during the tool change operation.

2. The clamp instruction method according to claim 1, wherein when two addition axes of different directions are coupled to one table, further comprising the steps of:
   determining whether or not selection of the clamp instruction for one addition axis is needed and generation of the clamp instruction is needed, and
   effecting selection of clamping for the other addition axis and generation of the clamp instruction when needed at approximately the same timings.

* * * * *